United States Patent
Vrame

(10) Patent No.: US 6,803,521 B2
(45) Date of Patent: Oct. 12, 2004

(54) FLOOR STAND HAVING PARALLEL UPRIGHTS OF ADJUSTABLE LENGTHS, FOR ELECTRICAL BOX HAVING PLASTER RING

(75) Inventor: Paul A. Vrame, Crystal Lake, IL (US)

(73) Assignee: Illini Electrical Sales, Inc., Crystal Lake, IL (US)

( * ) Notice: Subject to any disclaimer, the term of this patent is extended or adjusted under 35 U.S.C. 154(b) by 0 days.

(21) Appl. No.: 10/354,449

(22) Filed: Jan. 30, 2003

(65) Prior Publication Data

US 2004/0011548 A1 Jan. 22, 2004

Related U.S. Application Data

(63) Continuation-in-part of application No. 10/304,553, filed on Nov. 26, 2002, and a continuation-in-part of application No. 09/930,645, filed on Aug. 15, 2001, now Pat. No. 6,590,155, and a continuation-in-part of application No. 09/841,867, filed on Apr. 25, 2001, now Pat. No. 6,573,449.

(51) Int. Cl.[7] .................................................. H01H 9/02
(52) U.S. Cl. .............................. 174/58; 174/50; 174/57; 174/63; 220/3.2; 220/3.7; 248/906; 439/535
(58) Field of Search ............................... 174/58, 50, 63, 174/64, 54, 60, 57, 53, 48; 220/3.2, 3.3, 3.8, 3.6, 3.7, 3.9; 248/906, 27.1, 205.1, 300, 311.2; 312/242, 245; 52/220.7, 220.8; 439/535

(56) References Cited

U.S. PATENT DOCUMENTS

| | | | | | |
|---|---|---|---|---|---|
| 1,774,934 A | * | 9/1930 | Mangin | ....................... | 248/906 |
| 1,982,957 A | * | 12/1934 | Knell | ......................... | 220/3.9 |
| 4,494,296 A | * | 1/1985 | Grimes | ....................... | 174/63 |
| 4,790,505 A | * | 12/1988 | Rose et al. | ................. | 248/300 |
| 4,967,990 A | * | 11/1990 | Rinderer | ..................... | 220/3.9 |
| 5,044,582 A | * | 9/1991 | Walters | ....................... | 248/57 |
| 5,098,046 A | * | 3/1992 | Webb | ......................... | 174/48 |
| 5,224,673 A | * | 7/1993 | Webb | ......................... | 174/48 |
| 5,386,959 A | * | 2/1995 | Laughlin et al. | ............ | 248/906 |
| 5,423,499 A | * | 6/1995 | Webb | ........................ | 248/906 |
| 5,931,425 A | * | 8/1999 | Oliva | .......................... | 174/58 |
| 5,938,157 A | * | 8/1999 | Reiker | ........................ | 248/906 |
| 6,098,939 A | * | 8/2000 | He | ................................ | 174/58 |
| 6,590,155 B2 | * | 7/2003 | Vrame et al. | ................. | 174/50 |

* cited by examiner

Primary Examiner—Dean A. Reichard
Assistant Examiner—Angel R. Estrada
(74) Attorney, Agent, or Firm—Wood, Phillips, Katz, Clark & Mortimer

(57) ABSTRACT

A floor stand for mounting an electrical box having a plaster ring has an upper structure, a lower structure, and two parallel uprights, each of which has an upper part having an upper end and a lower part having a lower end. The upper structure bridges the upper ends of the upper parts. The lower structure bridges the lower ends of the lower parts. The upper and lower parts are separate parts, which are fastened together at any one of a plurality of possible elevations of the upper structure above the lower structure, via fasteners, such as screws, which pass through vertical slots in the upper parts, into holes in the lower parts.

5 Claims, 1 Drawing Sheet

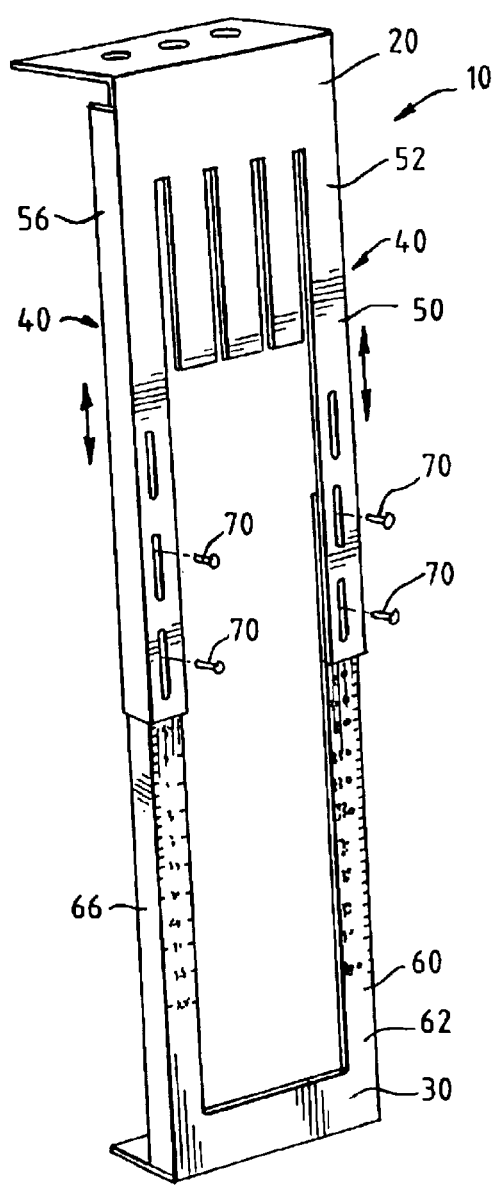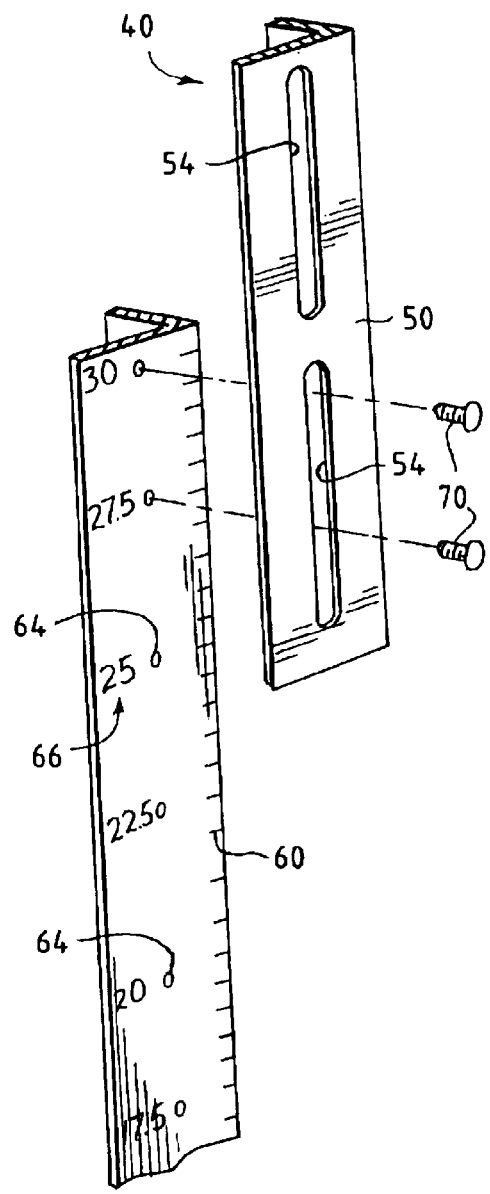

FLOOR STAND HAVING PARALLEL UPRIGHTS OF ADJUSTABLE LENGTHS, FOR ELECTRICAL BOX HAVING PLASTER RING

CROSS-REFERENCES TO RELATED APPLICATIONS

This application is (1) a continuation-in-part of U.S. patent application Ser. No. 09/841,867, which was filed on Apr. 25, 2001, now U.S. Pat. No. 6,573,449, and the disclosure of which is incorporated herein by reference, (2) a continuation-in-part of U.S. patent application Ser. No. 09/930,645, which was filed on Aug. 15, 2001, now U.S. Pat. No. 6,590,155, and the disclosure of which is incorporated herein by reference, and (3) a continuation-in-part of U.S. patent application Ser. No. 10/304,553, which was filed on Nov. 26, 2002, and the disclosure of which is incorporated herein by reference.

TECHNICAL FIELD OF THE INVENTION

This invention pertains to a floor stand for an electrical box having a plaster ring. This invention contemplates that the floor stand has two parallel uprights of adjustable lengths.

BACKGROUND OF THE INVENTION

Commonly, an electrical box having a plaster ring defines a generally rectangular cavity, which is bounded by an upper wall, a lower wall, and two lateral walls, each said wall having a distal edge, and by a back wall. The plaster ring, which may be also called a mud ring or a faceplate, defines a generally rectangular frame, which is bounded by an upper member, a lower member, and two lateral members. The plaster ring is fastenable to the electrical box, via fasteners passing through slots in the plaster ring into ears on the electrical box, so that the upper member of the plaster ring is aligned with the distal edge of the upper wall of the electrical box, so that the lower member of the plaster ring is aligned with the distal edge of the lower wall of the electrical box, and so that each of the lateral members of the plaster ring is aligned with the distal edge of one of the lateral walls of the electrical box.

For mounting an electrical box having a plaster ring, as described above, it has been known to use a floor stand (such as the EZ Floor Stand Box Support, which is available commercially from S-P Products, Inc. of Elk Grove Village, Ill.) to which the electrical box is fastened by fasteners passing through holes in the back wall of the electrical box, into holes selected from series of holes spaced vertically and incrementally along the floor stand, or to which the plaster ring is fastened by fasteners passing through slots or holes in the plaster ring, into holes selected therefrom. The floor stand permits the electrical box having the plaster ring not only to be horizontally positionable, because the floor stand does not fasten to a stud, but also to be vertically positionable at incrementally spaced positions above a floor.

As disclosed in U.S. patent application Ser. No. 09/841,867, supra, a floor stand for mounting an electrical box having a plaster ring has two parallel uprights, each having an upper end and a lower end, and has an upper structure bridging the lower ends of the parallel uprights and a lower structure bridging the upper ends of the parallel uprights. As disclosed therein, moreover, the parallel uprights are positionable between the lateral members of the plaster ring and the distal edges of the lateral walls of the electrical box when the plaster ring is fastened to the electrical box, via fasteners passing between the parallel uprights.

For mounting an electrical box having a plaster ring, as described above, between two studs, it is known to use a mounting bracket defining elongate frame having an upper member and member and mounting the electrical box having the plaster ring, via fasteners passing between the upper and lower members. See U.S. Pat. No. 5,330,137 and U.S. Pat. No. 5,931,425, both to John H. Oliva.

SUMMARY OF THE INVENTION

As compared to the floor stand disclosed in U.S. patent application Ser. No. 09/841,867, supra, this invention provides a floor stand having an upper structure, a lower structure, and two parallel uprights of adjustable lengths. Each of the parallel uprights has an upper part and a lower part.

The upper structure bridges the upper ends of the upper parts. The lower structure bridges the lower ends of the lower parts. The upper and lower parts are separate parts, which are fastened together at any one of a plurality of possible elevations of the upper structure above the lower structure.

Preferably, the upper structure and the upper parts are unitary and the lower structure and the lower parts are unitary. Preferably, the upper and lower parts are fastened together by fasteners, such as screws, which pass through vertical slots in the upper parts, into holes in the lower parts. Preferably, one of the upper and lower parts fits slidably within the other of the upper and lower parts.

BRIEF DESCRIPTION OF THE DRAWINGS

FIG. 1 is a partly exploded, perspective view of a floor stand embodying this invention and having an upper structure, a lower structure, and two parallel uprights of adjustable lengths, each upright having an upper part and a lower part, which are fastened together via screws. FIG. 2, on a larger scale, is a further exploded, fragmentary detail of the upper and lower parts and screws of one of the uprights.

DETAILED DESCRIPTION OF THE ILLUSTRATED EMBODIMENT

As illustrated in FIGS. 1 and 2, a floor stand 10 for mounting an electrical box having a plaster ring has an upper structure 20, a lower structure 30, and two parallel uprights 40 of adjustable lengths. The parallel uprights 40 extend vertically when the floor stand 10 is installed. Each upright 40 has an upper part 50 having an upper end 52 and a lower part 60 having a lower end 62. The upper part 50 of each upright 40 has several, vertically spaced, vertical slots 54. The lower part 60 of each upright 40 has multiple, vertically spaced, circular holes 64. On one upright 40 or on each upright 40, each hole 64 is marked by an adjacent notation on a measuring scale 66, which is stamped into the lower part 60 thereof, as illustrated in FIG. 2.

The upper structure 20, which is unitary with the upper parts 50, bridges the upper ends 52 of the upper parts 50. The lower structure 30, which is unitary with the lower parts 60, bridges the lower ends 62 of the lower parts 60. Being separate parts, the upper and lower parts 50, 60, are fastened together so as to place the upper structure 20 at any one of a plurality of possible elevations of the upper structure 20 above the lower structure 30, via self-tapping screws 70 passing through selected slots 54 of the upper parts 50, into selected holes 64 of the lower parts 60.

Each upper part 50 has an outer, backturned, stiffening flange 56. Each lower part 60 has an outer, backturned, stiffening flange 66. The outer flanges 56, 66, of the upper and lower parts 50, 60, are spaced apart so that the lower parts 60 fit slidably within the upper parts 50, so as to permit the upper and lower parts 50, 60, to be slidably adjusted, as suggested by arrows in FIG. 1.

When used for mounting an electrical box having a plaster ring, the floor stand 10 is used in a manner disclosed in U.S. patent application Ser. No. 09/841,867, supra. Except as illustrated and described herein, the floor stand 10 may be similar to any of the floor stands disclosed in any of the patent applications noted above as having their disclosures incorporated herein by reference.

What is claimed is:

1. A floor stand for mounting an electrical box having a plaster ring, the floor stand having an upper structure, a lower structure, and two parallel uprights of adjustable lengths, the parallel uprights extending vertically when the floor stand is installed, each upright having an upper part having an upper end, each upright having a lower part having a lower end, the upper structure bridging the upper ends of the upper parts, the lower structure bridging the lower ends of the lower parts, the upper and lower parts being separate parts, which are fastened together so as to place the upper structure at any one of a plurality of possible elevations of the upper structure above the lower structure.

2. The floor stand of claim 1 wherein the upper structure and the upper part are unitary and wherein the lower structure and the lower part are unitary.

3. The floor stand of claim 1 wherein the upper and lower parts are fastened together by fasteners, which pass through vertical slots in the upper parts, into holes in the lower parts.

4. The floor stand of claim 2 wherein the upper and lower parts are fastened together by fasteners passing through vertical slots in the upper parts, into holes in the lower parts.

5. The floor stand of claim 1, 2, 3, or 4 wherein one of the upper and lower parts fits slidably within the other of the upper and lower parts.

* * * * *